United States Patent
Beck

(10) Patent No.: US 6,530,463 B1
(45) Date of Patent: Mar. 11, 2003

(54) CLUTCH SYSTEM INSTALLED IN A TRANSMISSION

(75) Inventor: Karl Beck, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/958,101

(22) PCT Filed: Apr. 1, 2000

(86) PCT No.: PCT/EP00/02932

§ 371 (c)(1),
(2), (4) Date: Oct. 3, 2001

(87) PCT Pub. No.: WO00/60257

PCT Pub. Date: Oct. 12, 2000

(30) Foreign Application Priority Data

Apr. 7, 1999 (DE) .......................... 199 15 557

(51) Int. Cl.⁷ .......................... F16H 61/06; F16D 25/10
(52) U.S. Cl. .................. 192/87.18; 192/109 F; 192/91 R
(58) Field of Search .......... 192/91 R, 109 F, 192/91 A, 87.14, 87.15, 87.18

(56) References Cited

U.S. PATENT DOCUMENTS

| | | | |
|---|---|---|---|
| 2,998,732 A | 9/1961 | Nelson | 74/364 |
| 3,149,498 A | 9/1964 | Mack | 74/364 |
| 3,425,293 A | 2/1969 | Krawczyk et al. | 74/360 |
| 3,613,469 A | 10/1971 | McRoberts et al. | 74/361 |
| 3,715,017 A * | 2/1973 | Jenney | 192/109 F |
| 3,741,360 A * | 6/1973 | Patton | 192/87.18 |
| 3,809,201 A * | 5/1974 | Miyanishi et al. | 192/109 F |
| 4,583,624 A * | 4/1986 | Blake | 192/109 F |
| 4,620,560 A * | 11/1986 | Coutant | 137/115.14 |
| 4,751,866 A * | 6/1988 | Blake | 91/446 |
| 5,199,317 A | 4/1993 | Moore et al. | 74/361 |
| 5,700,220 A | 12/1997 | Legner | 475/129 |
| 5,918,509 A * | 7/1999 | Heilig et al. | 192/91 A |

FOREIGN PATENT DOCUMENTS

| | | | |
|---|---|---|---|
| DE | 44 05 299 A1 | 8/1995 | F16H/3/00 |
| DE | 195 17 888 A1 | 11/1996 | B60K/17/06 |
| EP | 0 537 810 A1 | 4/1993 | F16H/61/02 |
| JP | 2-118234 | 5/1990 | F16H/3/14 |
| JP | 07127785 | 5/1995 | F16L/55/04 |

* cited by examiner

*Primary Examiner*—Richard M. Lorence
*Assistant Examiner*—Eric M. Williams
(74) *Attorney, Agent, or Firm*—Davis & Bujold, P.L.L.C.

(57) ABSTRACT

A transmission comprising at least one clutch (3, 4) which for closing can be actuated by a spring force and for opening can be actuated by a hydraulic pressure and the clutch can be shifted in a manner such that the pressure medium of an actuating device (6, 7) previously subjected to pressure drains directly into a pressure medium reservoir (21) until a defined pressure level is reached and below a defined pressure level fills an accumulator (17, 24) and flows out of the accumulator (17, 24) via a throttle point (22, 25) into a pressure medium reservoir (21) to make a pressure-modulated shifting of the clutch (3, 4) possible.

8 Claims, 3 Drawing Sheets

CLUTCH SYSTEM INSTALLED IN A TRANSMISSION

FIELD OF THE INVENTION

The invention relates to a transmission where clutches or brakes are closed by spring force and hydraulically reopened in order to connect the input of the transmission with the output of the transmission, or to separate or shift different ratio steps.

BACKGROUND OF THE INVENTION

The transmission of the above described, kind is often a reversing transmission such as used in lift trucks like loaders. One clutch for a forward gear and one clutch for a reverse gear is preferably used, but it can also be the input assembly of a multi-gear reversing transmission especially used in construction machinery like loaders, excavators, etc.

Transmissions of the kind which used clutches or brakes closed by spring force and reopened by a hydraulic force have the advantage that by modulation of the actuating pressure, the clutches or brakes can be shifted so that a controlled load take-over results. This is primarily needed in the reversing operation of a lift truck or of an emergency deceleration via a multi-disk clutch or a multi-disk brake until stoppage, since otherwise the result would be an inadmissibly high or too slow a deceleration.

DE 195 17 888 A1 discloses a reversing transmission shiftable under load in which the reversing clutches are closed by spring force and hydraulically reopened and a hydraulically opened clutch can be shifted via a valve for closing, the line to the actuating device of the clutch being connected with an accumulator and a diaphragm. The volume of the accumulator is designed substantially large enough to be able to contain the actuating device so that the disks can come into contact quickly after triggering of the gear shift. It is thus possible to bring a previously opened clutch quickly to a position in which the disks come into contact, since the volume in the actuating device is supplied to the accumulator. Due to elastic deformations of the parts, the disks only come into contact when this residual pressure fluid, when the accumulator is filled, is removed from the actuating device of the clutch via a throttle point in the pressure medium reservoir. After the disks have come into contact and the accumulator has been filled with this oil volume, a pressure-modulated load take-over of the clutch takes place by the oil of the accumulator flowing off into the pressure medium reservoir via a diaphragm and thus a pressure which is determined by the accumulator and likewise crops up on the actuating device of the clutch, is still maintained over a specific period of time. If a previously hydraulically opened clutch is shifted, via a valve for closing, the accumulator, which is connected with the clutch, is filled with oil and slowly discharges via the diaphragm toward the pressure medium reservoir. If a gear shift again takes place in which the actuating device of the clutch is again loaded with pressure and the accumulator still has not completely discharged its oil volume, via the diaphragm, into the pressure medium reservoir, then the accumulator is partly filled. If then one other gear shift occurs in which the clutch again has been actuated for closing and thus the actuating device of the clutch again becomes connected with the accumulator, it is not possible for the accumulator to contain the complete oil volume of the actuating device of the clutch, since pressure fluid of the preceding gear shift still exists in the accumulator and thereby the disks of the clutch do not immediately come into contact, since the pressure fluid in the actuating device of the clutch must now discharge via the diaphragm. The load take-over of the clutch occurs with a time delay so that, e.g. in case of a desired downshift, the vehicle still covers an inadmissible distance until a load take-over. If the function of the parking brake or the dynamic emergency brake takes place, via two reciprocally stressing clutches, there can thus be produced, during such previously indicated closely consecutively following gear shifts, a condition in which the driver has introduced the parking brake by the load take-over of the clutch occurs only thereafter which could lead to an inadmissible and dangerous situation.

The problem on which this invention is based is to provide a transmission having a clutch system in which at least one clutch is closed by spring force and can be hydraulically reopened, the load take-over of the clutch proceeds under a pressure modulation and the time until load take-over of the clutch is independent of the distance in time of the gear shifts.

This problem is solved with a transmission according to the preamble and also including the characteristic features of the main claim.

SUMMARY OF THE INVENTION

According to the invention, the clutch or brake is opened by the actuating device of the clutch or the brake being loaded with pressure while, with the aid of a valve, the actuating device of the clutch or the brake is connected with a source of pressure medium. If the clutch or the brake is closed, the actuating device of the clutch or the brake is connected with the aid of a valve with an accumulator and a diaphragm so that a spring, which acts upon the actuating device of the clutch or the e, moves the oil volume in the actuating device into the accumulator thus bringing the disks of the clutch or the brake into contact. The volume of the accumulator is designed in a manner such as preferably to correspond to the volume of the actuating device of the clutch or the brake. If a certain pressure level has been reached in the actuating device or the accumulator, the valve, which is connected with the actuating device or the accumulator, opens so that the pressure medium can flow out from the actuating device directly into the pressure medium reservoir. The valve automatically closes again when a certain pressure level has been reached in the actuating device or the accumulator. It is thus ensured that regardless of whether or not the accumulator has already been filled with pressure medium the initial situation for the pressure-modulated take-over in the clutch is always the same, since above a certain pressure level the pressure medium reservoir until at a previously defined pressure level the accumulator is entirely filled with pressure medium and the disks of the clutch come into contact. The volume of the accumulator can thus be designed also independently of the volume of the actuating device of the clutch or the brake, since the accumulator no longer must absorb all the volume of the actuating device inasmuch as the pressure-modulated load take-over of the clutch depends only on the pressure-time curve which depends on the design of the accumulator and the diaphragm with which the accumulator is connected and through which the pressure medium of the accumulator flows into the pressure, medium reservoir. The accumulator is preferably configured so that, via the piston of the accumulator, a communication to the pressure medium reservoir always results when the accumulator is completely filled with pressure medium. However, the communication of the accumulator or the actuating device of the clutch with the pressure medium reservoir above a certain pressure level can also exist via a separate valve in which case additional parts are needed. For the pressure-modulated load take-over, the volume of the accumulator discharges via a diaphragm into the pressure medium reservoir. The diaphragm can be designed as an independent part, but it is also convenient to design the annular gap which forms between the piston of the accumulator and the cylinder wall thereof so, that a defined throttle point can be used as drainage of the pressure medium from the accumulator of the pressure medium reservoir. While the accumulator no longer has to absorb the whole volume of the actuating device but, above a certain pressure level, removes an excessive volume directly into the pressure medium reservoir, the previously defined pressure level can be designed so that immediately after the gear shift for closing of the clutch the disk set abuts and transmits a defined torque. Thus any time delay up to load take-over is eliminated, since also the pressure medium volume which as a consequence of elastic deformation of the actuating device and of the clutch, still has to be removed until load take-over likewise is removed down to a previously defined pressure level directly into the pressure medium container. The inadmissible time delay during load take-over of a parking brake, or an emergency brake, or a reversing clutch is thus entirely eliminated.

BRIEF DESCRIPTION OF THE DRAWINGS

The invention will now be described, by way of example, with reference to the accompanying drawings in which.

DETAILED DESCRIPTION OF THE INVENTION

Figure 1:
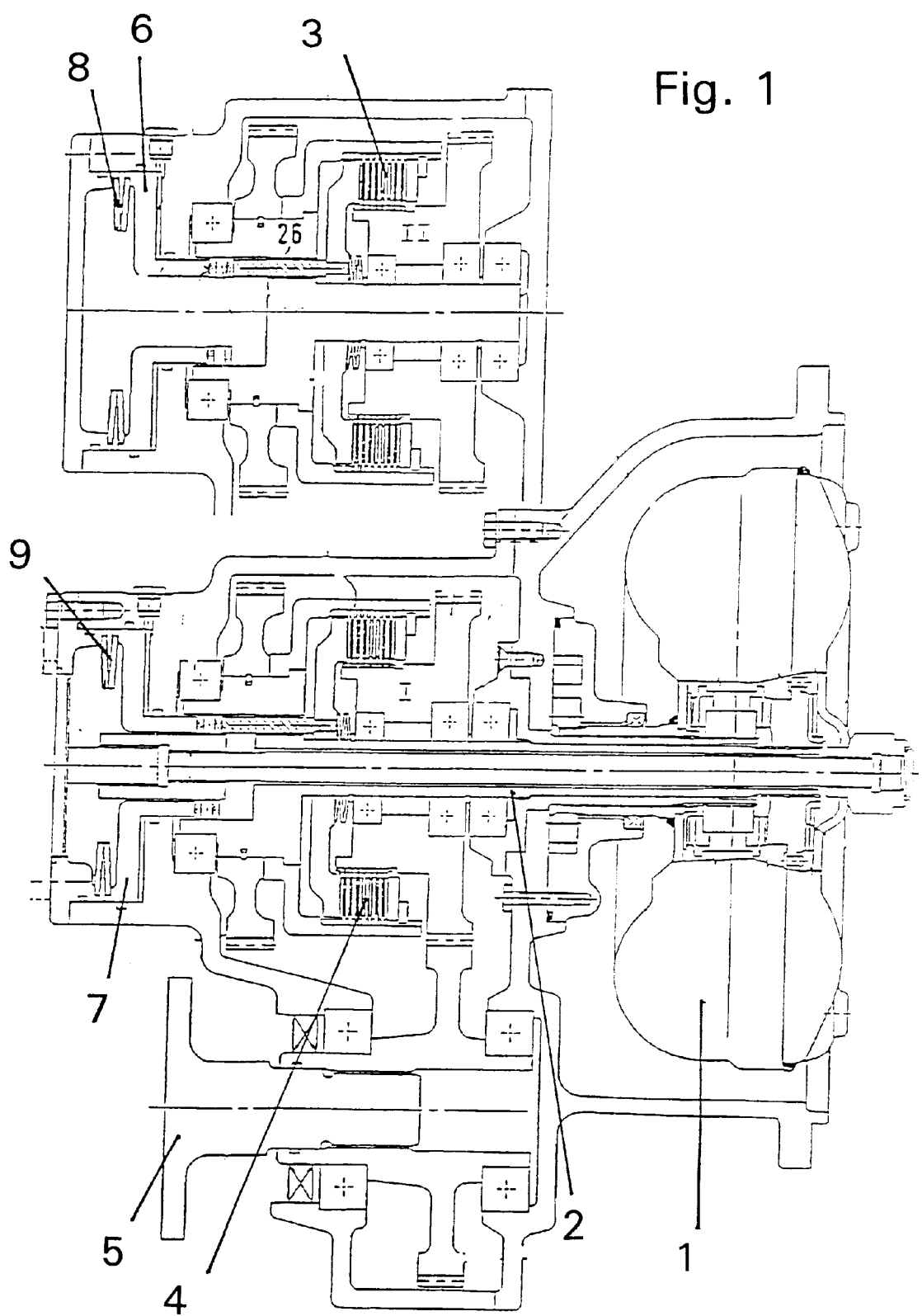
FIG. 1 is a reversing transmission shiftable under load where the clutches for a forward gear and a reverse gear are hydraulically opened and can be closed by spring force. The function of the parking brake is obtained by the fact that both clutches are closed while both actuating devices are pressurelessly shifted whereby the output is blocked.
Figure 2:
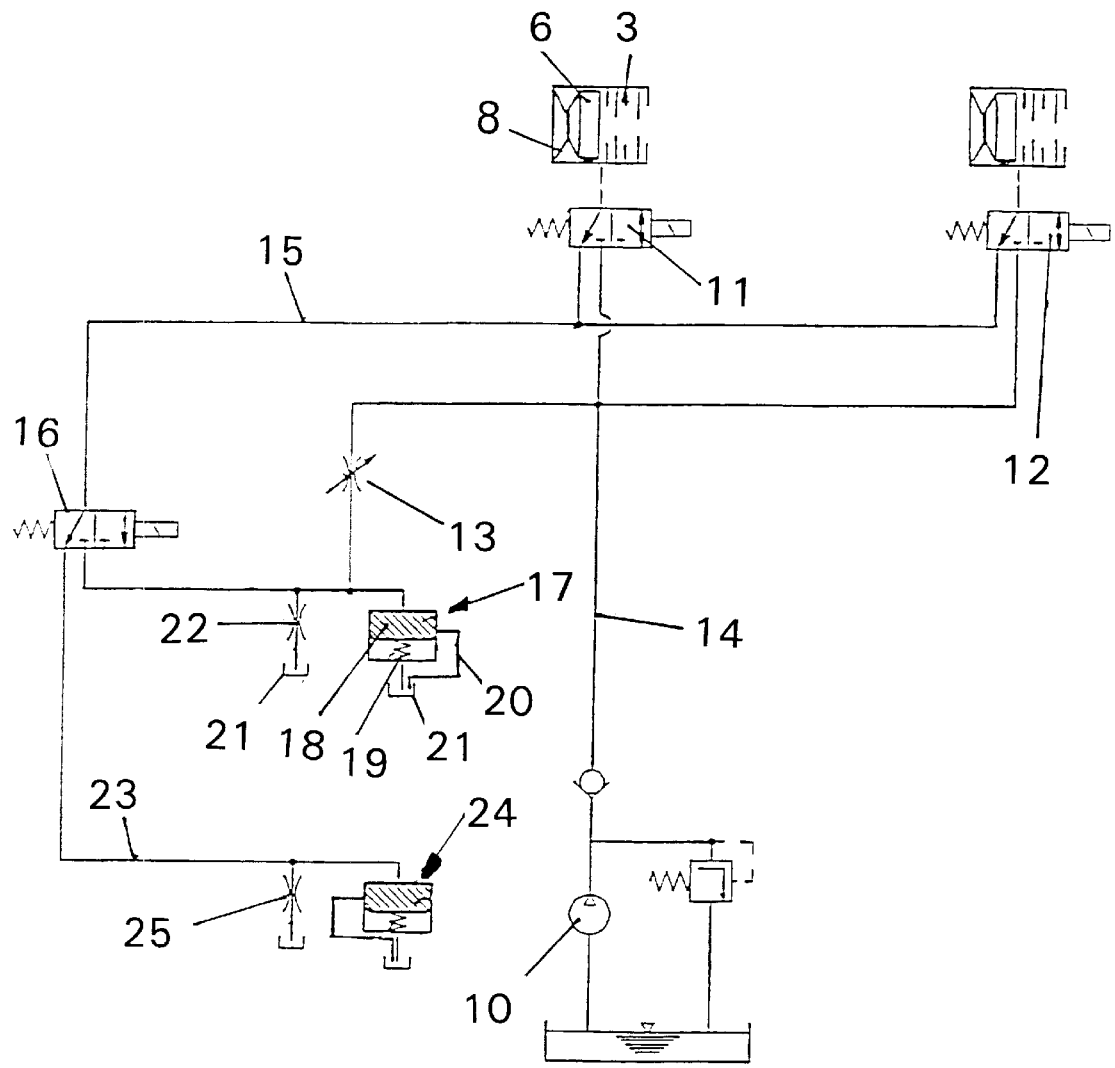
FIG. 2 is a hydraulic diagram of a transmission with two shiftable clutches.
Figure 3:
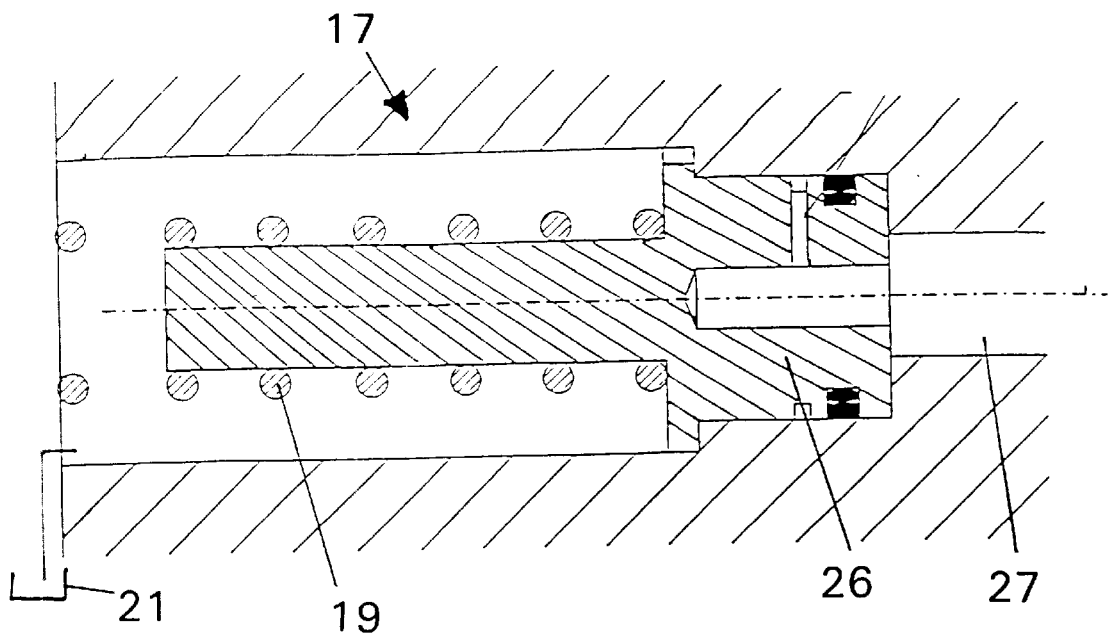
FIG. 3 is an accumulator which is pressureless.
Figure 4:
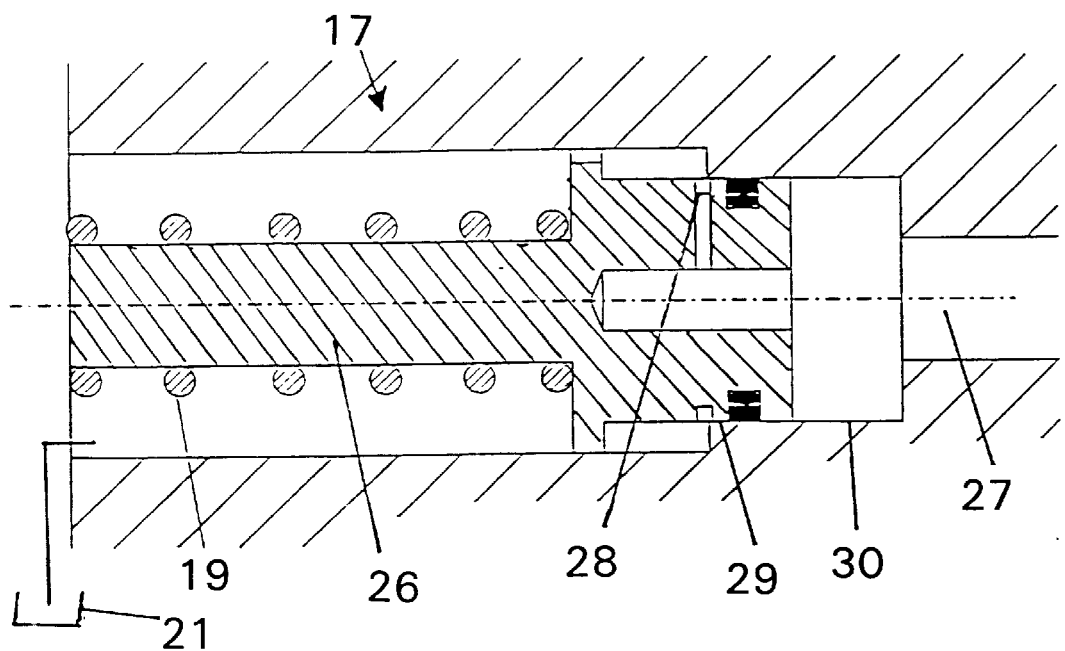
FIG. 4 is an accumulator which is loaded with pressure.

FIG. 1:

One prime mover (not shown) drives an input shaft 2 of a transmission via a converter 1. A forward and reverse driving direction can be shifted by the clutches 3 and 4 so that the output shaft 5 rotates in a forward or a reverse direction. The clutches 3 and 4 are shifted via the actuating devices 6 and 7. If the actuating device 6 is pressureless, a spring 8 closes the clutch 3. If the actuating device 6 is loaded with pressure, the clutch 3 opens. If the actuating device 7 is pressureless, the spring 9 closes the clutch 4. If the actuating device 7 is loaded with pressure, the clutch 4 is opened. The actuating devices 6 and 7 are connected with an accumulator, as described in FIGS. 3 and 4.

FIG. 2:

A pump 10 conveys pressure medium to valves 11 and 12 and to an inching valve 13 which is closed when no inching function is needed. If the actuating device 6 of the clutch 3, is loaded with pressure with the aid of the valve 11, the clutch 3 opens against the force of the spring 8. By means of the valve 11, if the actuating device 6 of the clutch 3 is separated from the feed line 14 and connected with the return line 15, the pressure medium of the actuating device 6 is pressed via the valve 16, which in normal operation connects the accumulator 17 with the return line 15, into the accumulator 17 by the spring 8 exerting a force upon the actuating device 6. The piston 18 of the accumulator 17 moves contrary to the force of the spring 19 until it reaches a previously defined pressure level. Up on reaching the pressure level, the piston 18 connects the return line 15 with line 20 through which an amount of pressure medium can flow off into the pressure medium reservoir 21 until falling below a previously defined pressure. If the pressure falls below, the piston 18 closes the communication of the return line 15 to the line 20 and the pressure medium in the accumulator 17 has to discharge, via a diaphragm 22, into the pressure medium reservoir 21. The previously defined pressure under which the piston 18 connects the return line 15 with the line 20 is designed so that the disks of the clutch 3 abut and transmit a defined torque. The diaphragm 22 and the volume in the accumulator 17 and the force of the spring 19 are designed so that a desired pressure-modulated load take-over occurs in the clutch 3. Also when the actuating device 6 of the clutch 3 is repeatedly connected with the feed line 14 and then with the return line 15 so that a condition appears in which the accumulator 17 is filled with pressure medium and the actuating device 6 likewise is filled with pressure medium, the whole volume of the actuating device 6 can discharge, via, the lines 15 and 20 into the pressure medium reservoir 21, up to a previously defined pressure level so that the disks of the clutch 3 always come into contact at the same, previously defined state in time and pressure level. In order to be able to implement different gear shifts, the return line 15 is connected, via a valve 16, with line 23 whereby it is possible, by virtue of the design of an accumulator 24 and a diaphragm 25, to implement a wider curve of a pressure over the course of time.

FIG. 3:

If the piston 26 of the accumulator 17 is pressureless, the piston 26, as consequence of the force of the spring 19, is in its initial position. The space of the spring 19 is connected with a pressure medium reservoir 21. A line 27 communicates with a return line 15.

FIG. 4:

If the piston of the accumulator 17 is loaded with pressure, via the line 27, while the accumulator 17 is connected with an actuating device of a clutch, the piston 26 moves in an axial direction, against the force of the spring 19, until the pressure medium, which flows from the line 27 to the piston 26, can discharge via a hole 28 toward the pressure medium reservoir 21. The piston 26 remains in this position until enough pressure medium has discharged from an actuating device of a clutch or brake to the pressure medium reservoir 21 so that the pressure in the line 27 drops below a specific value and the spring 19 moves the piston 26 to an extent such that the opening 28 is again sealed. A defined gap 29, through which the volume which is still in the prestressed accumulator 17 can now flow off, is located between the piston 26 and the hole 30 of the accumulator 17. Thereby the pressure in the line 27 and in the actuating device of a clutch breaks down slowing so that a pressure-modulated load take-over of the clutch can result. By the function of the diaphragm and the function of the valve, which removes pressure fluid down to a certain pressure level right into the pressure medium reservoir in-which the accumulator 17 is integrated; and the accumulator 17 being in the transmission housing, it is possible to provide a compact transmission with few component parts.

| Reference numerals | |
|---|---|
| 1 | torque converter |
| 2 | input shaft |
| 3 | clutch |
| 4 | clutch |
| 5 | output shaft |
| 6 | actuating device |
| 7 | actuating device |
| 8 | spring |
| 9 | spring |
| 10 | pump |
| 11 | valve |
| 12 | valve |
| 13 | inching valve |
| 14 | feed line |
| 15 | return line |
| 16 | valve |
| 17 | accumulator |
| 1 | piston |
| 19 | spring |
| 20 | line |
| 21 | pressure medium reservoir |
| 22 | diaphragm |
| 23 | line |
| 24 | accumulator |
| 25 | diaphragm |
| 26 | piston |
| 27 | line |
| 28 | opening |
| 29 | gap |
| 30 | hole |

What is claimed is:

1. A transmission hating at least one clutch (3, 4) hydraulically disengageable, against a spring force, by a respective actuating device (6, 7) connectable with a feed line (14) and the at least one clutch (3, 4) is engageable by the spring force while the respective actuating device (6, 7) is connectable with a return line (15) which communicates with at least one accumulator (17, 24) and with a hydraulic reservoir (21), via a throttle point (22, 25), so that hydraulic medium conveyed to the at least one accumulator (17, 24) and existing in the respective actuating device (6, 7) drains through the throttle point (22, 25);

wherein the respective actuating device (6, 7) communicates with the return line (15), the return line (15) is in direct communication with the hydraulic reservoir (21) and, upon the respective actuating device (6, 7) reaching a previously defined pressure level, the hydraulic medium in the return line (15) and in the at least one accumulator (17, 24) drains into the hydraulic reservoir (21) exclusively through the throttle point (22, 25); and the at least one accumulator (17, 24) is a spring accumulator which has one piston (26), and a front face of the piston (26) is connected with the return line (15) of the respective actuating device (6, 7) and an opposite face of the piston is connected with the hydraulic reservoir (21).

2. The transmission according to claim 1, wherein, above a previously defined pressure level, the piston (26) of the at least one accumulator (17, 24) connects the return line (15) of the respective actuating device (6, 7) with the hydraulic reservoir (21).

3. The transmission according to claim 1, wherein an annular gap (29) is formed between the piston (26) and an housing of the at least one accumulator (17, 24), and the annular gap (29) forms the throttle point (22, 25) which, beneath a previously defined pressure level, connects the return line (15) of the actuating device (6, 7) with the hydraulic reservoir (21).

4. The transmission according to claim 1, wherein the transmission is a reverse transmission which has at least two clutches (3, 4) and a first of the at least two clutches (3 or 4) is actuatable for forward drive and a second of the at least two clutches (4 or 3) is actuatable for reverse drive.

5. The transmission according to claim 4, herein by a pressureless shifting of the first of the at least two clutches (3 or 4) for forward drive and a pressureless shifting of the second of the at least two clutches (4 or 3) for reverse drive, the first and second clutches (3, 4) are connected and engaged with one another so that an output shaft (5) of the transmission is non-rotatably restrained.

6. The transmission according to claim 4, wherein a spring force engages the first of the at least two clutches (3 or 4) for forward drive and a spring force engages the second of the at least two clutches (4 or 3) for reverse drive so that the first and second clutches (3, 4) are connected and engaged with one another to prevent rotation of an output shaft (5) of the transmission.

7. The transmission according to claim 1, wherein the accumulator (17, 24) has a hydraulic volume substantially corresponding to a hydraulic volume required to be removed from the respect actuating device (6, 7) so that disks of the respective clutch (3, 4) initially commence contact with one another.

8. A transmission having at least one clutch (3, 4) hydraulically disengageable, against a spring force, by a respective actuating device (6, 7) connectable with a feed line (14) and the at least one clutch (3, 4) is engageable by the spring force while the respective actuating device (6, 7) is connectable with a return line (15) which communicates with at least one accumulator (17, 24) and with a hydraulic reservoir (21), via a throttle point (22, 25), so that hydraulic medium conveyed to the at least one accumulator (17, 24) and existing in the respective actuating device (6, 7) drains through the throttle point (22, 25);

wherein the respective actuating device (6, 7) communicates with the return line (15), the return line (15) is in direct communication with the hydraulic reservoir (21) and, upon the respective actuating device (6, 7) reaching a previously defined pressure level, the hydraulic medium in the return line (15) and in the at least one accumulator (17, 24) drains into the hydraulic reservoir (21) exclusively through the throttle point (22, 25);

the transmission is a reverse transmission which has at least two clutches (3, 4) and a first of the at least two clutches (3 or 4) is actuatable for forward drive and a second of the at least two clutches (4 or 3) is actuatable for reverse drive; and the transmission also includes two accumulators (17, 24), and each one of the two accumulators (17, 24) comprise is a spring accumulator which has one piston (26), and a front face of the pistol (26) is connected with the return line (15) of the respective actuating device (6, 7) and an opposite face of the piston is connected with the hydraulic reservoir (21).

* * * * *